United States Patent [19]

Turner et al.

[11] 4,140,746

[45] Feb. 20, 1979

[54] RECOVERY OF CHLORINE VALUES FROM IRON CHLORIDE BY-PRODUCED IN CHLORINATION OF ILMENITE AND THE LIKE

[75] Inventors: John H. W. Turner, Chapel-en-le-Frith; Charles E. E. Shackleton, London, both of England

[73] Assignee: Mineral Process Licensing Corporation B.V., The Hague, Netherlands

[21] Appl. No.: 848,305

[22] Filed: Nov. 3, 1977

[30] Foreign Application Priority Data

Nov. 17, 1976 [GB] United Kingdom ............... 47867/76

[51] Int. Cl.² ...................... C01G 49/06; C01B 17/45; C01B 31/28; C07C 19/06
[52] U.S. Cl. ........................................ 423/79; 423/469; 423/493; 423/500; 423/568; 423/571; 423/633; 260/544 K; 260/654 R; 260/659 R; 260/664
[58] Field of Search .................. 423/69, 74, 79, 138, 423/149, 467, 469, 493, 633, 568, 571; 75/1 T; 260/544 K, 656 AC, 659 R, 664

[56] References Cited

U.S. PATENT DOCUMENTS

| 2,245,076 | 6/1941 | Muskat et al. ........................ 423/79 |
| 2,642,339 | 6/1953 | Sawyer ................................ 423/633 |
| 2,852,339 | 9/1958 | Hill .................................... 423/493 |
| 3,562,321 | 2/1971 | Borkowski et al. .................. 260/664 |

*Primary Examiner*—Brian Hearn
*Attorney, Agent, or Firm*—William R. Liberman

[57] ABSTRACT

The invention relates to the recovery of chlorine values from iron chloride by-produced from the chlorination of a titaniferous material containing more than 5% by weight iron oxide, and particularly from the carbochlorination of ilmenite, which, for example, can be the first stage in the so-called chloride route to form titanium dioxide pigment.

The iron chloride which may be ferric chloride or ferrous chloride is subjected to a combination of reduction and oxidation reactions. In the reduction reaction, ferric chloride is dechlorinated to ferrous chloride by a reducing agent suitable for producing a chloride compound for recycle to the chlorination process or for sale and in the oxidation reaction ferrous chloride is oxidized to ferric oxide and ferric chloride, the ferric chloride being recycled to the reduction reaction. By this method the chlorine values are recovered from by-product iron chloride by a route which avoids the difficult reaction between ferric chloride and oxygen to produce chlorine and ferric oxide.

56 Claims, 1 Drawing Figure

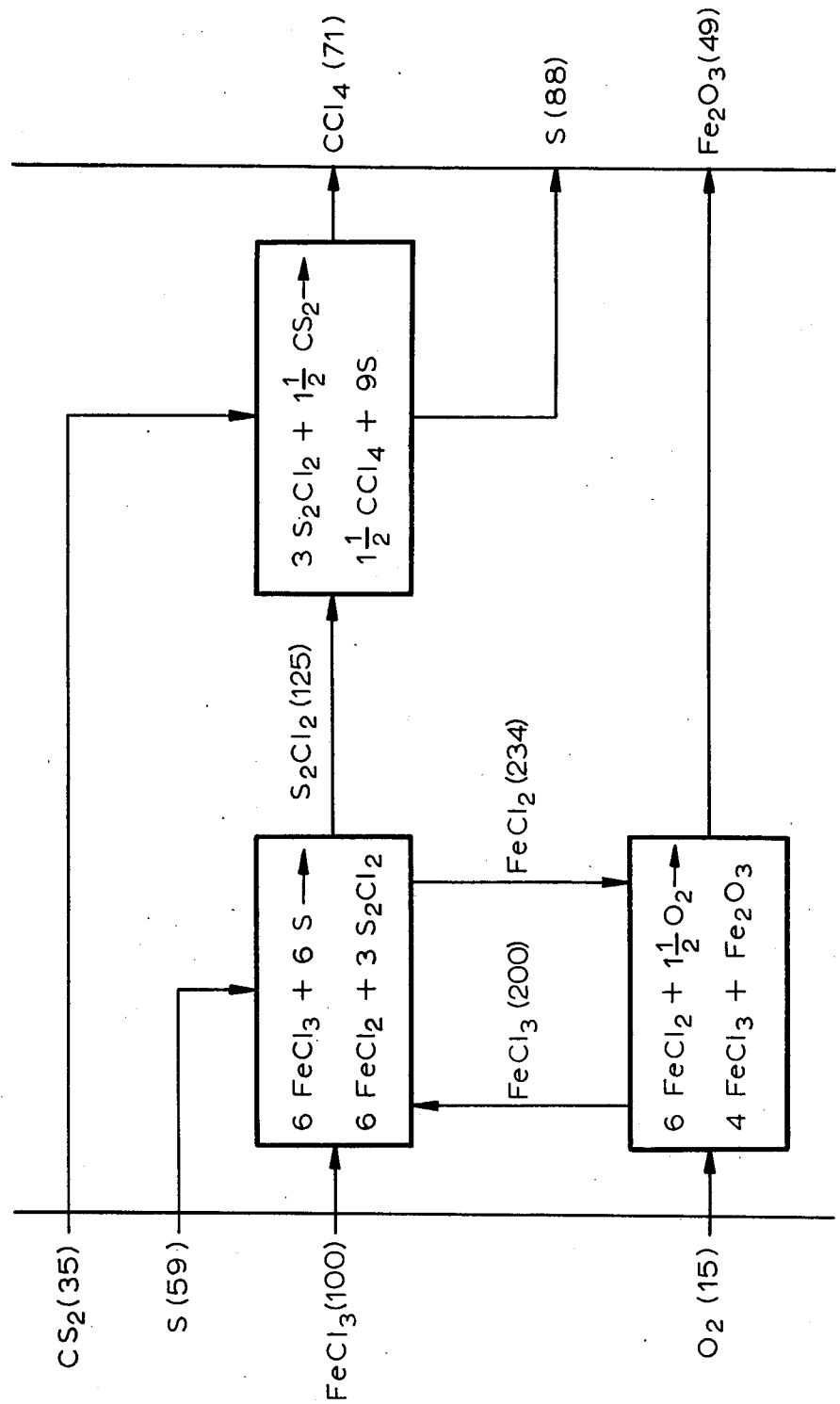

RECOVERY OF CHLORINE VALUES FROM IRON CHLORIDE BY-PRODUCED IN CHLORINATION OF ILMENITE AND THE LIKE

The invention relates to the recovery of chlorine values from iron chloride obtained as a by-product from the chlorination of a titaniferous material containing more than 5% by weight iron oxide, particularly ilmenite.

When ilmenite is chlorinated in order to extract its titanium content as TiCl$_4$ by known chlorination processes and, in particular, by so-called "carbo-chlorination" which is chlorination in the presence of carbon or a carbon-containing reducing agent e.g. chlorination in the presence of carbon and carbon monoxide at temperatures between 800° C. and 1200° C., significant quantities of iron chloride are usually obtained as a by-product. This chloride by-product may be either ferrous or ferric chloride or a combination of both, depending on the reaction conditions in the chlorinator.

This iron chloride by-product contains a considerable content of valuable chlorine in chemically combined form. It is desirable, therefore, to recover these chlorine values for recycling to the chlorinator. This is particularly true when the chlorination of ilmenite forms the first stage in the so-called chloride route to titanium dioxide pigment, since the quantity of by-product iron chloride is then considerable.

Various attempts have, therefore, been made over the past 30 years to recover the chlorine values from iron chloride, primarily to serve the needs of the ilmenite carbo-chlorination process.

These attempts have centered around iron chloride oxidation in which the following reaction is involved:

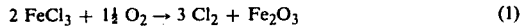

$$2\ FeCl_3 + 1\tfrac{1}{2}\ O_2 \rightarrow 3\ Cl_2 + Fe_2O_3 \qquad (1)$$

However, it has proved very difficult to develop a satisfactory industrial process incorporating the reaction exemplified in equation (1).

Many efforts have been made to overcome the attendant difficulties. For example, it has been proposed to conduct the reaction represented by the equation (1) in the gaseous phase. However, temperatures at which an adequate reaction rate is obtained have been found to be too high for practical operation since at high temperatures the equilibrium of the reaction becomes increasingly unfavourable to chlorine recovery. An additional problem of vapour phase oxidation is that, in generating solid iron oxide reaction product from gaseous reactants, there is a severe tendency for oxide scale to accumulate on the reactor walls and associated equipment, thereby causing problems in the efficient operation and maintainance of the reactor.

It was subsequently found that the reaction represented by the equation (1) is catalysed by iron oxide particles, and an iron oxide fluidised bed reactor was proposed both to lower the reaction temperatures and to provide an answer to scale accumulation. However, it has been demonstrated that oxide scale nonetheless occurs above bed level, to such an extent that the outlet may become completely plugged. Moreover, serious problems were encountered in increasing the size of the fluid bed reactor towards an industrial scale for this reaction.

Another proposal has been to operate the oxidation process represented by the equation (1) at lower temperatures using a salt melt to form a salt complex or eutectic with the iron compound; or by conducting the oxidation under a pressure sufficient to effect the liquifaction of the ferric chloride. However, these methods require the use of complicated apparatus and the exercise of very careful controls over operating conditions. Furthermore, difficulties are encountered in the removal of by-product iron oxide from the reactor and in the sticking of the particulate bed material when this is employed.

None of the processes previously disclosed in the patent literature for recovering the chlorine contained in iron chloride by processes which involve reaction (1) appears to have achieved commercial status despite years of effort.

The absence of a satisfactory industrial process for recovering the chlorine from iron chloride has contributed to a number of problems affecting the TiO$_2$ pigment industry. For example, iron chloride, obtained as a by-product from the chlorination of ilmenite to extract TiCl$_4$, is dumped on a large scale down deep wells or at sea. This procedure involves both a loss of chlorine and environmental hazards.

In addition, many TiO$_2$ pigment producers have continued to use relatively expensive rutile as a major feedstock for the chloride route to TiO$_2$ pigment instead of the relatively inexpensive ilmenite since rutile has a lower iron content.

Accordingly for economic and environmental reasons there is a need in the industry for an industrially acceptable method of recovering the chlorine values from iron chloride obtained as by-product in the chlorination of ilmenite.

We have now found a method for recovering the chlorine values from iron chloride by-produced in the chlorination of a titaniferous material containing more than 5% by weight iron oxide such as ilmenite which, in contrast to the previous attempts revealed in the prior art, avoids dependence on the difficult reaction between oxygen and iron chloride (as illustrated in equation (1)) to evolve chlorine and ferric oxide.

Thus the present invention provides a method of recovering the chlorine values from iron chloride obtained as a by-product from the chlorination of a titaniferous material containing more than 5% by weight iron oxide which comprises the steps of:

(a) subjecting ferric chloride obtained as a by-product from the chlorination of the titaniferous material and/or ferric chloride obtained as a product of the oxidation step (b) to partial dechlorination in the presence of one or more suitable reducing agents;

(b) subjecting the resulting ferrous chloride and/or ferrous chloride obtained as a by-product from the chlorination of the titaniferous material to an oxidation reaction in the presence of oxygen or a molecular oxygen-containing gas at a temperature between 300° C. and 1200° C. to produce ferric chloride and ferric oxide; and, (c) recycling the resulting ferric chloride to the partial dechlorination step.

In the context of this invention a suitable reducing agent is one which meets the two following conditions: firstly that it is effective in dechlorinating ferric chloride to ferrous chloride; secondly that in the reaction with ferric chloride, it produces a chloride compound which, directly or after further processing, is either suitable for recycle to the chlorination process or has other industrial utility.

The method in accordance with the present invention involves a combination of a reduction step (a) and an oxidation step (b). In the reduction step (a) ferric chloride obtained as the by-product of the chlorination of a titaniferous material containing more than 5% iron oxide process and/or as a co-product of the oxidation step (b) is partially dechlorinated to ferrous chloride by one or more suitable reducing agents. In the oxidation step (b), ferrous chloride obtained as the by-product of the chlorination of a titaniferous material containing more than 5% iron oxide and/or as a product of the reduction step (a) is reacted with sufficient oxygen or molecular oxygen-containing gas at a temperature between 300° C. and 1200° C. to produce ferric chloride and ferric oxide. Ferric chloride evolved from the oxidation stage is recycled to the reduction step (a). The method according to the present invention is preferably carried out continuously.

If the iron chloride by-product of the chlorination of the titaniferous material contains a predominant or even significant proportion of ferric chloride, it is normally desirable for the process to start with the reduction step (a).

Thus, according to one embodiment of the method according to the invention ferric chloride obtained as a by-product of the chlorination of a titaniferous material such as ilmenite is subjected to the partial dechlorination step (a) to form ferrous chloride and a chloride compound or compounds, and the resulting ferrous chloride is subjected to the oxidation step (b) to form ferric oxide and ferric chloride, the ferric chloride being recycled to the partial dechlorination step (a).

However, if the iron chloride by-product is predominantly ferrous chloride, it is then possible for the process to start with the oxidation step (b).

Thus, according to another embodiment of the method according to the invention ferrous chloride obtained as a by-product of the chlorination of the titaniferous material is subjected to the oxidation step (b) to form ferric oxide and ferric chloride; the resulting ferric chloride is then subjected to the partial dechlorination step (a) to form ferrous chloride and a chloride compound or compounds. The resulting ferrous chloride is subjected to a further oxidation step (b) and the ferric chloride resulting from the oxidation step is recycled.

Alternatively, the ferric and ferrous components of the iron chloride by-product from the chlorination of the titaniferous material may be separated by boiling off the former. The ferric chloride thus separated is introduced into step (a) of the method and the ferrous chloride thus separated is introduced into step (b).

The present invention thus provides a means for dechlorinating iron chloride which does not depend on the difficult reaction exemplified in equation (1). This is achieved by dechlorinating the iron chloride in the reduction of ferric to ferrous chloride, thus leaving the relatively limited objective for the oxidation stage of converting ferrous chloride to ferric oxide and ferric chloride, as in the following reaction:

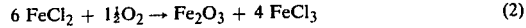

$$6 \text{ FeCl}_2 + 1\tfrac{1}{2} \text{O}_2 \rightarrow \text{Fe}_2\text{O}_3 + 4 \text{ FeCl}_3 \tag{2}$$

Compared with the oxidation process represented by equation (1), the reaction exemplified in equation (2) goes readily to completion at relatively moderate temperatures, thus avoiding the need for any special procedures of the type which had to be adopted in the attempts to develop a viable process involving equation (1).

The iron chloride used as starting material in the method according to the present invention is obtained as a by-product of the chlorination of a titaniferous material containing more than 5% by weight of iron oxide, generally ilmenite or titanium slag.

In a particular embodiment of the invention the iron chloride used as the feed material in the method according to the present invention is derived as a by-product from the carbo-chlorination of ilmenite, that is chlorination of ilmenite in the presence of carbon or a carbon containing reducing agent most preferably a mixture of carbon and carbon monoxide. Carbo-chlorination is suitably carried out at temperatures of between 800° C. and 1200° C. According to another embodiment of the invention the iron chloride used as the feed material is obtained from the chlorination of the titaniferous material in the presence of sulphur and/or a sulphur-containing reducing agent.

The preferred embodiment of the reduction step will vary with the type of reducing agent used in the associated ilmenite chlorination plant, the availability of the effective reducing agents for converting ferric to ferrous chloride, and the market scope for the resulting chloride compounds.

Suitable reducing agents which, directly or after further processing, produce chloride compounds suitable primarily for recycle to the chlorination process include sulphur, chlorine polysulphides in which the atomic ratio of sulphur to chlorine is more than 1:1, carbon disulphide, and carbon monoxide.

In the case of sulphur, ferric chloride is reduced in the following reaction:

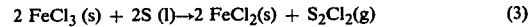

$$2 \text{ FeCl}_3 \text{(s)} + 2\text{S (l)} \rightarrow 2 \text{ FeCl}_2 \text{(s)} + \text{S}_2\text{Cl}_2\text{(g)} \tag{3}$$

in the case of chlorine polysulphides in which the atomic ratio of sulphur to chlorine is more than 1:1, ferric chloride is reduced in the following reaction, taking $S_5Cl_2$ as a typical chloride polysulphide:

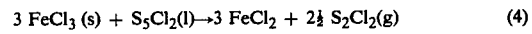

$$3 \text{ FeCl}_3 \text{(s)} + S_5\text{Cl}_2\text{(l)} \rightarrow 3 \text{ FeCl}_2 + 2\tfrac{1}{2} \text{ S}_2\text{Cl}_2\text{(g)} \tag{4}$$

$S_2Cl_2$ produced in reactions (3) and (4) may either be recycled directly to the chlorinator, as would be appropriate in the case of chlorination in the presence of sulphur, or its chloride content may be processed into a form suitable for recycle to a carbo-chlorinator, e.g. by reacting sulphur monochloride with carbon bisulphide to form carbon tetrachloride and sulphur or by heating sulphur monochloride above its dissociation temperature (444° C.) and cooling the resulting gas rapidly to produce chlorine and chlorine polysulphides.

In the case of carbon bisulphide, ferric chloride is reduced in the following reaction:

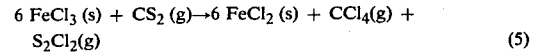

$$6 \text{ FeCl}_3 \text{(s)} + \text{CS}_2 \text{(g)} \rightarrow 6 \text{ FeCl}_2 \text{(s)} + \text{CCl}_4\text{(g)} + \text{S}_2\text{Cl}_2\text{(g)} \tag{5}$$

Carbon tetrachloride produced in equation (5) is directly suitable for recycle to a carbo-chlorinator, and co-product $S_2Cl_2$ can be made readily so by reaction with carbon bisulphide. The reaction exemplified in equation (5) requires initiation preferably by sulphur or sulphur monochloride.

In the case of carbon monoxide, ferric chloride is reduced in the following reaction:

$$2 FeCl_3(s) + CO(g) \rightarrow 2 FeCl_2(s) + COCl_2(g) \qquad (6)$$

Phosgene produced in equation (6) may be recycled directly to a carbo-chlorinator. The reaction exemplified in equation (6) requires activation by the presence, preferably, of sulphur or sulphur monochloride.

Reducing agents which are not suitable for recycle to the chlorinator but which have other industrial utility include unsaturated hydrocarbons such as acetylene which readily undergo addition reactions. In the case of acetylene, tetrachloroethane is produced in the dechlorination of ferric chloride without the by-production of HCl. Other possible suitable reducing agents include hydrogen and saturated hydrocarbons such as methane but these are less preferred.

One preferred embodiment of the reduction step is cited below, by way of example.

One method of carrying out the reduction step, which would be suitable where the iron chloride feed material is derived from the carbo-chlorination of ilmenite, involves reacting sulphur with ferric chloride, as illustrated in equation (3).

Solid ferric chloride in powder form and liquid sulphur are fed continuously and separately to an enclosed heated reactor e.g. a troughed reactor, with the ferric chloride slightly in excess of stoichiometric proportion. The troughed reactor is suitably provided with a screw conveyer and stirrer. It may be necessary to employ a number of troughed reactors in series in order to realise a sufficiently complete reaction, but one only is assumed for the purposes of this description. The troughed reactor is suitably provided with a jacket for conveying a heat transfer fluid which would be operated to develop an increasing temperature inside the reactor as the material passes along it. The reactants are heated on entry to the reactor to the initiation temperature of about 115° C., and thereafter the heat is built up to a maximum of 400° C. towards the reactor exit. Solid ferrous chloride and gaseous sulphur monochloride, containing a small proportion of unreacted ferric chloride, are continously withdrawn from the reactor. The sulphur monochloride is condensed to a liquid and reacted with sufficient carbon bisulphide to convert it to carbon tetrachloride and sulphur, according to equation (7) by the following known reaction:

$$S_2Cl_2(l) + \tfrac{1}{2} CS_2(l) \rightarrow \tfrac{1}{2} CCl_4(l) + 3 S(s) \qquad (7)$$

The sulphur by-product is recycled to the reaction step (a) and for carbon bisulphide manufacture. The carbon tetrachloride product is then available for recycle to the carbo-chlorinator or for use in another chemical process.

The reaction conditions of the oxidation step (b) are less subject to variations and alternatives depending on industrial circumstances than is the reduction stage. The oxidation reaction is carried out at a temperature between 300° C. and 1200° C. preferably between 300° C. and 900° C. and more particularly between 450° C. and 600° C.

According to a preferred embodiment of the method according to the invention, the oxidation of ferrous chloride according to equation (2) is carried out in a fluid bed of the product, ferric oxide, into which the reactants are fed continuously in approximately stoicheiometric proportions and from which gaseous ferric chloride and solid ferric oxide are continuously removed. The bed temperature is preferably maintained between 450° C. and 600° C.

Since the reaction is only mildly exothermic, oxygen is used in preference to dry air and may be fed to the reactor unheated provided that the ferrous chloride feed is preheated to about 100° C. below the desired operating temperature for the bed. Bed fluidisation is maintained by the input oxygen and the product ferric chloride. It is important to keep the oxygen content of the off-gas to minimum levels in order to prevent the build-up of oxide scale on the reactor walls and associated equipment. This can be achieved by feeding the ferrous chloride in slight stoichiometric excess in terms of equation (2) such that the bed and bed overflow contain a few percent of ferrous chloride. This will not entail a serious loss of ferrous chloride: for example, a 5% by weight content of ferrous chloride in the ferric oxide bed would involve losses of only 1% of input ferrous chloride in the bed overflow and under 2% of the total chlorine values fed to the process. It would, however, be desirable to deal with the residual ferrous chloride content of the ferric oxide product either by leaching with water or by a dry air purge in order to assist with its satisfactory disposal, especially since it could have a significant value as a synthetic micaceous iron oxide pigment. The ferric chloride off-gas from the oxidation stage is condensed out, preferable employing a fluidised bed of solid ferric chloride as described in copending U.K. patent application No. 21390/77, and recycled to the reduction stage.

The accompanying flow sheet illustrates one preferred embodiment of the method according to the present invention involving a combination of reduction and oxidation stages as previously described. This embodiment would be suitable e.g. where the iron chloride feed material is derived from the carbo-chlorination of ilmenite. It is assumed that the iron chloride feed is all ferric chloride. The approximate quantities (in tonnes) of the main inputs to, outputs from and internal flows in the process are shown per 100 tonnes of input ferric chloride. The inputs are shown on the left of the flowsheet and the outputs are shown on the right. The reactions taking place in the three main process stages are also identified.

The invention is further illustrated by the following Examples which for the sake of convenience, have been carried out on a batch procedure.

EXAMPLE 1

Stage A

Ferric chloride obtained from the carbo-chlorination of ilmenite with an analysis of minimum 96% FeCl$_3$ and maximum 1% FeCl$_2$, was charged in solid powder form together with reagent grade flowers of sulphur to a reaction flask. Care was taken during transfer to the flask to minimise the contact of the reactants with moist air as ferric chloride especially is very hygroscopic. The reactants within the sealed flask were then thoroughly mixed by shaking together since it had been found in previous experimental work that preliminary mixing was of primary importance in achieving a good reaction. The charge weight of ferric chloride was 100 grams, and the sulphur was 95% stoichiometric approximately according to equation (3). The reaction flask was connected to a condenser and to a nitrogen line. The reactor and condenser were flushed with nitrogen to displace oxygen and moisture before initiating the reaction. The reaction was initiated by heating the flask reactor with a mantle furnace to a temperature above the melting point of sulphur. Thereafter, the bed temperature was increased slowly over the reaction period up to a final temperature of 400° C. The total reaction period was 2 hours. The solid reactor product had the following analysis:

$FeCl_3$:0.3%, S:2.5%, $FeCl_2$:97%.

The physical nature of the ferrous chloride product was a mixture of lumps and fines, the lumps consisting of many small crystals which were readily broken down into fine material. The gaseous sulphur monochloride product was condensed in the water-cooled condenser and collected in a flask. It contained no ferric ions and had a liquid gravity of 1.677.

Stage B

450 Grams of ferric oxide in powder form and 75 grams of ferrous chloride (manufactured in Stage A above) were thoroughly mixed together. The material was then charged to a vertical stirred bed reactor to rest on a sintered disc at the reactor's base. The material was heatd up to 550° C., using external heaters around the reactor cylinder. Throughout the heat up, nitrogen was introduced through the sintered disc to purge the material and the reactor system of any moisture or oxygen.

During heat-up, HCl gas was identified at the exit of the condenser in line after the reactor, indicating that there was some loss of chloride during the heat-up, although the losses were small in proportion to the chloride input to the reactor as can be seen from the results below. When bed temperature stabilised at 550° C., the nitrogen flow was discontinued and oxygen (dried with $CaCl_2$) was introduced through the sintered disc. The flow rate was 500 mls per minute. Total running time was 30 minutes, although the reaction was apparently completed sooner. $FeCl_3$ was evolved during the first 5 minutes of the reaction period, and was collected in the condenser. The weight of ferric chloride was 57 g which was 93% of the theoretical amount, as per equation 2. 0.7 grams of chlorine were collected in a KI bubbler downstream of the condenser. The iron oxide residue weight was 464.4 grams which was close to the theoretical weight as per equation (2). The residue contained no iron chloride.

Stage C.

The ferric chloride produced in stage B was recycled to stage A.

EXAMPLE 2

The method was carried out according to Example 1 except that the following procedure was employed in place of stage A: 100 grams of ferric chloride, similar to that used in Example 1, and 1 gram of reagent grade flowers of sulphur, were thoroughly mixed together in an enclosed flask and then transferred to a vertical stirred bed reactor to rest in a sintered disc at the reactors base. Care was taken to minimise the contact of the reactants with moist air. The material and reactor system were flushed with nitrogen through the sintered disc, and the bed temperature was raised to 70° C. using external heaters. When the bed temprature reached 70° C. analytical grade $CS_2$ was substituted for nitrogen and the bed temperature was raised steadily to a maximum of 200° C. The $CS_2$ flow rate was 0.9 mls per minute. When the bed temperature reached 110° C., condensate started appearing in the cooled condenser downstream of the reactor. The run continued for sufficient time to provide an excess of $CS_2$ over that required stoichiometrically according to equation (5). The bed residue was a grey-brown colour and very friable. It contained 42% ferrous iron and 1% ferric iron. Since previous work at this reaction with analytical grade $CS_2$ alone had given no identifiable reaction under these conditions, the need for a reaction initiator like sulphur or $S_2Cl_2$ was demonstrated.

EXAMPLE 3

The method was carried out according to Example 1 except that the following procedure was employed in place of Stage A: 100 grams of ferric chloride, similar to that used in Example 1, were charged to a vertical stirred bed reactor to rest on a sintered disc at the reactors base. The ferric chloride and the reactor system were thoroughly flushed with nitrogen while the bed temperature was increased to 150° C. CO was then substituted for nitrogen and introduced through the sintered disc at a flow rate of 166 mls per minute. Shortly after starting the CO, 2 grams of $S_2Cl_2$ were volatilised into the reactor bed through a separate gas line to the one carrying CO. After the introduction of $S_2Cl_2$, no condensate appeared in the cooled condenser downstream of the reactor, until the run was nearing completion. An excess of CO over that required stoichiometrically according to equation (6) was used. A chloride compound, presumed to be phosgene, was absorbed in a caustic soda bubbler downstream of the cooled condenser. The bed residue had a similar appearance to that of Example 2 and contained 40% ferrous iron and 2% ferric iron. Previous work using CO alone for this reaction under these conditions had shown no identifiable reaction, thus indicating the need for an activator like sulphur or sulphur monochloride.

We claim:

1. In the process comprising chlorinating a titaniferous material containing more than 5 percent by weight iron oxide to obtain as a by-product iron chloride, and separating the iron chloride from the titaniferous material, the improvement comprising:
    (a) partially dechlorinating the ferric chloride from oxidation step (b) plus any ferric chloride in the iron chloride separated from the titaniferous material, in the presence of a reducing agent to form ferrous chloride and a chloride compound derived from the reducing agent whose chlorine values are, either directly or after processing, suitable for recycle to the titaniferous chlorination stage, and passing the ferrous chloride on to step (b); and
    (b) oxidizing the ferrous chloride produced in the dechlorinating stage (a) plus any ferrous chloride in the iron chloride separated from the titaniferous material, in the presence of an oxidising agent selected from the group consisting of oxygen and oxygen-containing gases and at a temperature of between about 300° C. and 1200° C. to produce ferric chloride and ferric oxide, passing the ferric chloride on to the dechlorination step (a) and removing the ferric oxide from the system;

whereby the chlorine value of the iron chloride separated from the titaniferous material is recovered as the chloride of the reducing agent, a material which directly or indirectly is suitable for recycle to the titaniferous chlorination stage.

2. The process of claim 1 wherein the reducing agent in the dechlorination stage (a) is selected from the group consisting of sulfur, chlorine polysulfides wherein the ratio of sulfur-to-chlorine is greater than 1, and mixtures of sulfur and said chlorine polysulfides and wherein the chloride compound formed in stage (a) is sulphur monochloride.

3. the process of claim 2, wherein the sulfur monochloride formed in the dechlorination stage (a) is recycled to the titaniferous chlorination stage.

4. The process of claim 2 wherein the sulfur monochloride formed in the dechlorination stage (a) is further treated by reaction with carbon disulfide to form carbon tetrachloride and sulfur, wherein a portion of the sulfur is recycled to the dechlorination stage (a).

5. The process of claim 2 wherein the sulfur monochloride formed in the dechlorination stage (a) is further thermally decomposed to form chlorine and chlorine polysulfides wherein the ratio of sulfur to chlorine is greater than 1.

6. The process of claim 5, wherein such chlorine polysulfides are recycled to the dechlorination stage (a) and wherein the chlorine is recycled to the chlorination of the titaniferous material.

7. the process of claim 2, wherein the reducing agent comprises elemental sulfur.

8. The process of claim 2, wherein the reducing agent comprises chlorine polysulfide, wherein the ratio of sulfur to chlorine is greater than 1.

9. The process of claim 2, wherein the reducing agent in stage (a) is liquid.

10. the process of claim 1, wherein the reducing agent in the dechlorination stage (a) is carbon monoxide and wherein the chloride compound formed in the dechlorination stage (a) is phosgene.

11. The process of claim 10, wherein the ferric chloride is in the solid state, wherein the partial dechlorination is carried out in the presence of sulphur or sulphur monochloride and wherein the chloride compound of stage (a) is phosgene ($COCl_2$).

12. The process of claim 11, wherein the phosgene is recycled to the titaniferous chlorination stage.

13. The process of claim 10, comprising in addition recycling the phosgene produced in the dechlorination stage (a) to the titaniferous chlorination stage.

14. The process of claim 1, wherein the reducing agent in the dechlorination stage (a) is carbon disulfide and wherein the chloride compound formed in the dechlorination stage (a) comprises carbon tetrachloride and sulphur monochloride.

15. The process of claim 14, wherein the ferric chloride is in the solid state, wherein the partial dechlorination is carried out in the presence of sulphur or sulphur monochloride and wherein the chloride compound comprises carbon tetrachloride and sulfur monochloride.

16. The process of claim 15, wherein the carbon tetrachloride is recycled to the initial stage for the chlorination of the titaniferous material.

17. The process of claim 14, comprising in addition reacting the sulfur monochloride with carbon disulfide to form elemental sulfur and carbon tetrachloride.

18. The process of claim 14, comprising in addition recycling the carbon tetrachloride formed in the dechlorination stage (a) to the titaniferous chlorination stage.

19. The process of claim 1, wherein the temperature in the oxidation stage (b) is in the range of from about 450° C. to about 600° C.

20. In the process comprising chlorinating, in the presence of carbon or a carbon-containing reducing agent, a titaniferous material containing more than 5 percent by weight iron oxide to obtain as a by-product iron chloride, and separating the iron chloride from the titaniferous material, the improvement comprising:
(a) partially dechlorinating the ferric chloride obtained from oxidation stage (b) plus any ferric chloride in the iron chloride separated from the titaniferous material in the presence of a reducing agent selected from the group consisting of sulfur and chlorine polysulfides wherein the ratio of sulfur to chlorine is greater than 1, to form ferrous chloride and a sulphur monochloride;
(b) oxidizing the ferrous chloride produced in the dechlorinating stage (a) plus any ferrous chloride in the iron chloride separated from the titaniferous material in the presence of an oxidizing agent, selected from the group consisting of oxygen and oxygen-containing gases at a temperature of between about 300° C. and about 1200° C. to produce ferric chloride and ferric oxide, passing the ferric chloride on to the dechlorination stage (a) and removing the ferric oxide from the system; and
(c) recovering the chlorine values from the sulphur monochloride produced in stage (a) in a form suitable for recycle to the titaniferous chlorination stage.

21. The process of claim 20, wherein the chlorine values are recovered in stage (c) by reacting the sulphur monochloride with carbon disulfide to form carbon tetrachloride and sulphur.

22. The process of claim 20, wherein the chlorine values are recovered in stage (c) by thermally decomposing the sulphur monochloride to form chlorine and chlorine polysulfides wherein the ratio of sulfur to chlorine is greater than 1.

23. The process of claim 20, comprising recycling the chlorine values recovered in step (c) back to the titaniferous material chlorinating stage.

24. A method in accordance with claim 20, wherein the titaniferous material is ilmenite.

25. A method in accordance with claim 20, in which the reducing agent for the dechlorination stage (a) is liquid sulfur or liquid chlorine polysulfide.

26. A method in accordance with claim 20, in which the ferrous chloride is oxidized in stage (b) at a temperature of from about 300° C. to about 900° C.

27. A method in accordance with claim 26, in which the temperature in the oxidation stage (b) is in the range of from about 450° C. to about 600° C.

28. A method in accordance with claim 20, in which the ferrous chloride is oxidized in oxidation stage (b) in a fluidized bed of the reaction product ferric oxide.

29. A method in accordance with claim 20, wherein the process is carried out in a continuous reaction procedure.

30. In the process comprising chlorinating, in the presence of carbon or a carbon-containing reducing agent, a titaniferous material containing more than 5 percent by weight iron oxide to obtain iron chloride as a by-product and separating the iron chloride from the titaniferous material, the improvement comprising:
(a) partially dechlorinating the ferric chloride from oxidation stage (b) plus any ferric chloride in the iron chloride separated from the titaniferous material, in the presence of carbon monoxide to form ferrous chloride and phosgene;

(b) oxidizing the ferrous chloride produced in the dechlorinating stage (a) plus any ferrous chloride in the iron chloride separated from the titaniferous material, in the presence of an oxidizing agent selected from the group consisting of oxygen and oxygen-containing gases, at a temperature of between about 300° C. and about 1200° C. to produce ferric chloride and ferric oxide, passing the ferric chloride on to the dechlorination stage (a) and removing the ferric oxide from the system.

31. The process of claim 30, which further comprises recycling the phosgene formed in the dechlorination stage (a) to the titaniferous chlorination stage.

32. A method in accordance with claim 30, wherein the titaniferous material is ilmenite.

33. A method in accordance with claim 30, wherein the ferric chloride is in the solid state, wherein the partial dechlorination is carried out in the presence of sulphur or sulphur monochloride and wherein the chloride compound of stage (a) is phosgene ($COCl_2$).

34. A method in accordance with claim 30, in which the ferrous chloride is oxidized in stage (b) at a temperature of from about 300° C. to about 900° C.

35. A method in accordance with claim 34, in which the temperature in the oxidation stage (b) is in the range of from about 450° C. to about 600° C.

36. A method in accordance with claim 30, in which the ferrous chloride is oxidized in oxidation stage (b) in a fluidized bed of the reaction product ferric oxide.

37. A method in accordance with claim 30, wherein the process is carried out in a continuous reaction procedure.

38. In the process comprising chlorinating, in the presence of carbon or a carbon-containing reducing agent, a titaniferous material containing more than 5 percent by weight iron oxide to obtain iron chloride as a by-product and separating the iron chloride from the titaniferous material, the improvement comprising:
    (a) partially dechlorinating the ferric chloride from oxidation stage (b) plus any ferric chloride in the iron chloride separated from the titaniferous material, in the presence of carbon disulfide to form ferrous chloride, carbon tetrachloride and sulphur monochloride;
    (b) oxidizing the ferrous chloride produced in the dechlorinating stage (a) plus any ferrous chloride in the iron chloride separated from the titaniferous material, in the presence of an oxidizing agent selected from the group consisting of oxygen and oxygen-containing gases, at a temperature of between about 300° C. and about 1200° C. to produce ferric chloride and ferric oxide, passing the ferric chloride on to the dechlorination stage (a) and removing the ferric oxide from the system; and
    (c) recovering the chlorine values from the sulphur monochloride produced in stage (a) in a form suitable for recycle to the titaniferous chlorination stage.

39. The process of claim 38 which further comprises recycling the chloride values recovered in stage (c) to the titaniferous chlorination stage.

40. The process of claim 38, which further comprises recycling the carbon tetrachloride formed in the dechlorination stage (a) to the titaniferous chlorination stage.

41. The process of claim 38, which further comprises reacting the sulphur monochloride formed in the dechlorination stage (a) with carbon disulfide to form carbon tetrachloride and sulphur.

42. The process of claim 41, which comprises recycling the carbon tetrachloride produced by reaction of sulphur monochloride with carbon disulfide to the titaniferous chlorination stage.

43. The process of claim 38, wherein the ferric chloride is in the solid state, wherein the partial dechlorination is carried out in the presence of sulphur or sulphur monochloride and wherein the chloride compound comprises carbon tetrachloride and sulphur monochloride.

44. A method in accordance with claim 38, wherein the titaniferous material is ilmenite.

45. A method in accordance with claim 38, in which the ferrous chloride is oxidized in stage (b) at a temperature of from about 300° C. to about 900° C.

46. A method in accordance with claim 45, in which the temperature of the oxidation stage (b) is in the range of from about 450° C. to about 600° C.

47. A method in accordance with claim 38, in which the ferrous chloride is oxidized in oxidation stage (b) in a fluidized bed of the reaction product ferric oxide.

48. A method in accordance with claim 38, wherein the process is carried out in a continuous reaction procedure.

49. In the process comprising chlorinating a titaniferous material containing more than 5 percent by weight iron oxide to obtain iron chloride as a by-product and separating the iron chloride from the titaniferous material, the improvement comprising:
    (a) partially dechlorinating the ferric chloride obtained from oxidation stage (b) plus any ferric chloride in the iron chloride separated from the titaniferous material in the presence of a reducing agent selected from the group consisting of unsaturated hydrocarbons which readily undergo addition reactions with chlorine to form ferrous chloride and chlorinated hydrocarbon, and passing the ferrous chloride on to stage (b); and
    (b) oxidizing the ferrous chloride produced in the dechlorinating stage (a) plus any ferrous chloride in the iron chloride in the presence of an oxidizing agent selected from the group consisting of oxygen and oxygen-containing gases, at a temperature in the range of between about 300° C. and about 1200° C. to produce ferric chloride and ferric oxide; passing the ferric chloride on to the dechlorination stage (a) and removing the ferric oxide from the reaction system; whereby the chlorine value in the iron chloride is regained as the chlorinated hydrocarbon.

50. The process of claim 49, wherein the reducing agent of stage (a) comprises acetylene.

51. A method in accordance with claim 49, wherein the titaniferous material is ilmenite.

52. A method in accordance with claim 49, in which the ferrous chloride is oxidized in stage (b) at a temperature of from about 300° C. to about 900° C.

53. A method in accordance with claim 52, in which the temperature of the oxidation stage (b) is in the range of from about 450° C. to about 600° C.

54. A method in accordance with claim 49, in which the ferrous chloride is oxidized in oxidation stage (b) in a fluidized bed of the reaction product ferric oxide.

55. A method in accordance with claim 49, wherein the process is carried out in a continuous reaction procedure.

56. In the process comprising chlorinating, a titaniferous material containing more than 5 percent by weight iron oxide to obtain an iron chloride by-product, and separating the iron chloride by-product from the titaniferous material, the improvement comprising:

(a) partially dechlorinating the ferric chloride obtained from the oxidation stage (b) plus any ferric chlroide in the iron chloride by-product in the presence of carbon bisulfide plus a second reducing agent selected from the group consisting of sulfur and chlorine polysulfide, wherein the ratio of sulfur to chlorine is greater than 1, to form ferrous chloride, and carbon tetrachloride and sulfur monochloride, the carbon tetrachloride being directly, and the sulfur monochloride being indirectly, after further reaction, suitable for recycle to the titaniferous material chlorination process, and passing the ferrous chloride on to stage (b);

(b) oxidizing the ferrous chloride produced in the dechlorinating stage (a) plus any ferrous chloride in the iron chloride by-product in the presence of an oxidizing agent comprising elemental oxygen at a temperature of between about 300° C. and about 1200° C. to produce ferric chloride and ferric oxide, passing the ferric chloride back to the dechlorination stage (a) and removing the ferric oxide from the system;

whereby the chlorine value of the iron chloride by-product is recovered as material which directly or indirectly is suitable for recycle to the titaniferous chlorination stage.

* * * * *